April 17, 1951  B. R. WINBORN, JR  2,549,274
ROTARY DRUM AND SHAFT ASSEMBLY
Filed April 19, 1948  2 Sheets-Sheet 1
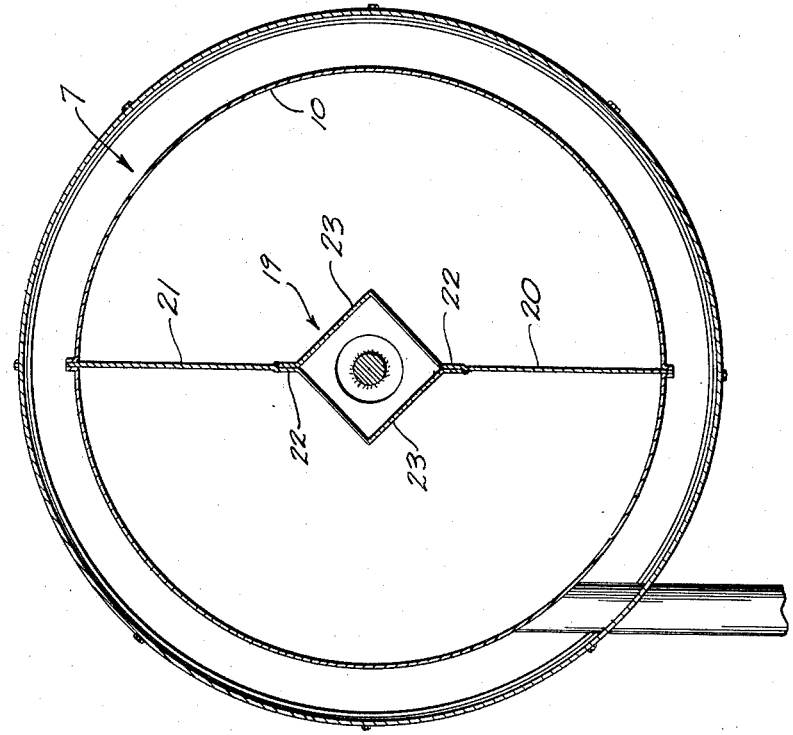
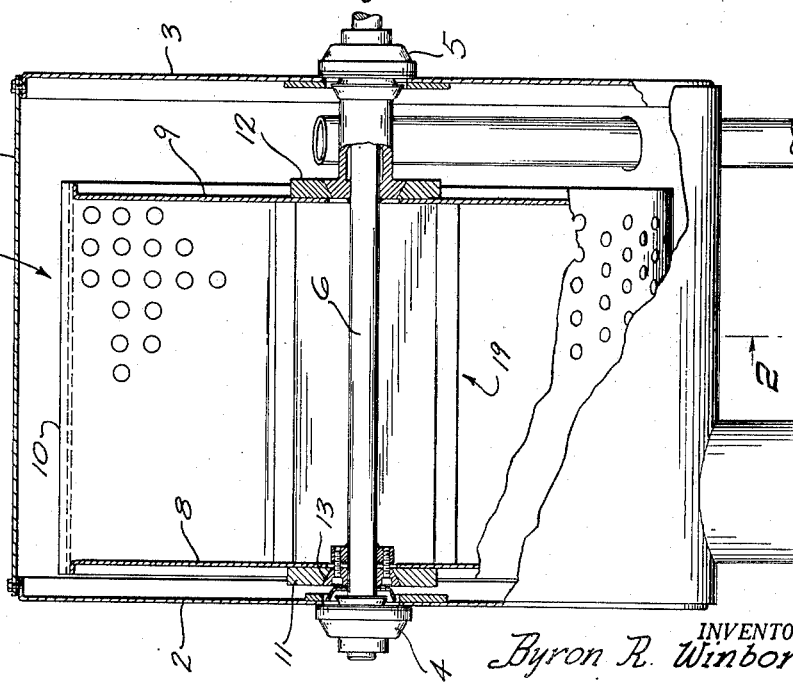
INVENTOR.
Byron R. Winborn, Jr.
BY
Arthur R. Woolfolk
Attorney

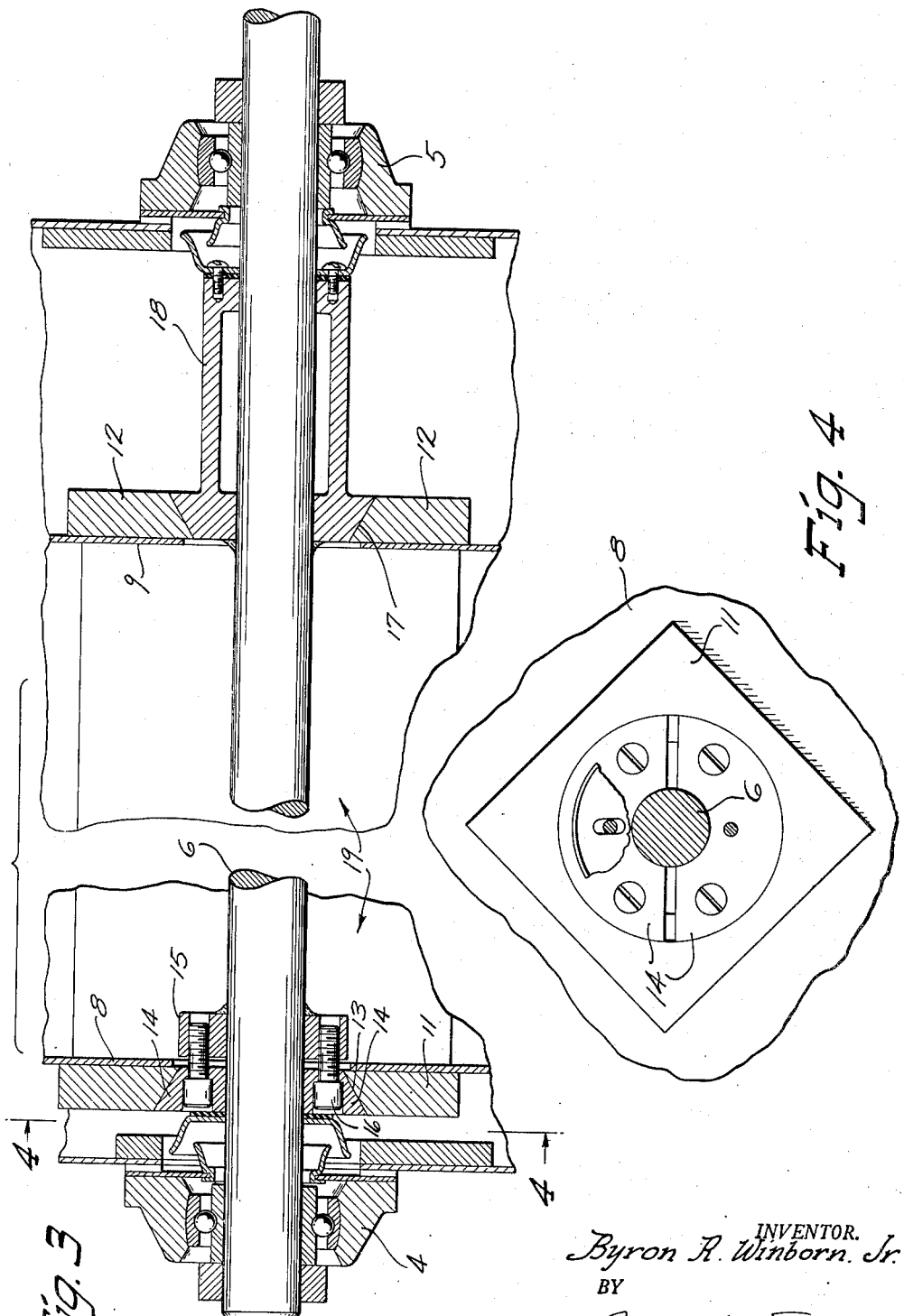

Patented Apr. 17, 1951

2,549,274

UNITED STATES PATENT OFFICE 2,549,274

ROTARY DRUM AND SHAFT ASSEMBLY

Byron R. Winborn, Jr., Manitowoc, Wis., assignor to Manitowoc Shipbuilding Company, Manitowoc, Wis.

Application April 19, 1948, Serial No. 21,905

3 Claims. (Cl. 210—63)

This invention relates to rotary drum and shaft assemblies such as those used in washers and extractors for dry cleaning equipment.

Objects of this invention are to provide a rotary drum and shaft assembly which is so constructed that the shaft is in tension between the end walls of the drum and a part at least of the drum is in compression. It has been found that such a construction as described above greatly lessens lateral whipping of the shaft even when the drum is rotated rapidly and it is, therefore, a primary object of this invention to provide a drum and shaft assembly for washers and extractors and the like in which the shaft has very little tendency to whip or sway laterally even when the drum is rapidly rotated, and in which a part at least of the basket or drum acts as a rigid portion of the shaft.

Further objects are to provide a drum and shaft assembly in which the drum or basket may be made of relatively light sheet metal and yet in which a substantial area is provided for contact with the shaft, and in which the weight of the drum is transmitted to the shaft at points closely adjacent the bearings which support the shaft.

An embodiment of the invention is shown in the accompanying drawings, in which—

Figure 1 is a fragmentary view of a washer and extractor for a dry cleaner, such view being partly broken away and partly in section.

Figure 2 is a sectional view on the line 2—2 of Figure 1.

Figure 3 is an enlarged sectional detail of the device with parts broken away.

Figure 4 is a section on the line 4—4 of Figure 3.

Referring to the drawings, it will be seen that a dry cleaner washer and extractor has been illustrated and comprises a casing 1 having side walls 2 and 3 which are provided with bearings 4 and 5, respectively. A shaft 6 is revolubly supported in the bearings and rigidly carries a perforated drum or basket 7, a few of the perforations having been shown. This basket is preferably formed of sheet metal and has side walls 8 and 9 and a cylindrical wall 10. The walls 8 and 9 have relatively heavy reinforcing plates 11 and 12 welded thereto. The plate 11 has a conical recess 13 formed therein and a split or two-part conical member 14 is arranged to fit in such recess as shown most clearly in Figures 3 and 4. The shaft 6 has welded thereon a collar 15. Screws or bolts 16 extend through the split, conical member 14 and are screwed into the collar 15. It is apparent from the description thus far given that when the screws 16 are tightened, that the shaft 6 is drawn to the left as viewed in Figures 1 and 3.

The reinforcing plate 12 for the wall 9 is similarly provided with a conical aperture 17 within which the conical end of an extended sleeve-like portion 18 seats. This sleeve-like portion 18 is welded to the shaft 6 and its right-hand end as viewed in Figure 3 is located closely adjacent the bearing 5, although the wall 9 of the drum is spaced a considerable distance from the wall 3. It is to be noted that this construction transmits the weight of the drum through the rigid, relatively heavy sleeve 18 to the shaft at a point closely adjacent the bearing 5.

The split, conical member 14 transmits the weight of the drum to the shaft 6 to a point closely adjacent the corresponding bearing 4.

A bracing, tubular structure indicated generally by the reference character 19, see particularly Figures 1 and 2, is provided and located between the walls 8 and 9. This bracing member 19 may be formed as a portion of the dividing partition formed of the two members 20 and 21. These members 20 and 21 constitute a partition and extend completely across the drum 7, being welded to the outer wall 10 at diametrically spaced points. The partition walls 20 and 21 are welded together at their overlapping portions 22. The part of the members 20 and 21 between the overlapping portions 22 is formed as a tubular structure forming a trough-like portion 23 in each of such members. These trough-like portions 23 may be angularly formed as shown, or could be round or could be of any other desired shape. The member 19 constitutes a tubular brace and its end, as well as the ends of the partition formed of the members 20 and 21, are welded to the side walls 8 and 9 of the drum.

It is apparent that when the screws 16 are tightened that the take-up means formed jointly by the two-part conical member 14, the collar 15, and the screws 16 serves to draw the shaft 6 to the left or, in other words, to tension the shaft 6. This force imparted to the shaft 6 and placing the shaft in tension is resisted by the compression member or tubular member 19 and also generally by the entire drum. However, the tubular, compression member 19, see Figures 1 and 2, bears the major portion of the force, resisting inward motion of the side walls 8 and 9 when the shaft is placed in tension. Thus the entire drum, but particularly the tubular, reinforcing member 19, constitutes in effect a part of the shaft 6 and the shaft is prevented from whipping when it is rapidly rotated, although the drum may be unevenly loaded.

It has been found that this structure is highly effective in preventing whipping of the shaft 6 and it is a simple construction and one that is easily produced.

Heretofore, where a drum of this type has been supported on an ordinary type of shaft, it has been found that when the drum is rapidly rotated the shaft is very liable to whip and that this tendency is very much increased when the drum is unevenly loaded.

Another way of looking at this structure is that the transverse dimension of the shaft has, in effect, been very much increased by the tubular, reinforcing, compression member 19.

It will be seen that a novel rotary drum and shaft assembly has been provided by this invention in which take-up means are employed to place the shaft in tension between the walls of the drum and that a compression member positioned between such walls is placed in compression and thus, in effect, the compression member at least, constitutes a part of the shaft so far as its resistance to lateral deflection is concerned. Thus it is possible by means of this invention without increasing the size of the shaft to obtain a very marked increase in its lateral rigidity.

Although this invention has been described in considerable detail, it is to be understood that such description is intended as illustrative rather than limiting, as the invention may be variously embodied and is to be interpreted as claimed.

I claim:

1. In a device of the class described, a stationary casing provided with spaced bearings, a shaft revolubly supported in said bearings, a rotary drum rigid with said shaft and located between said bearings, and means at opposite ends of said drum arranged to transmit the weight of said drum to said shaft at points closely adjacent said bearings, one of said means being rigidly attached to said shaft and the other of said means having take-up means arranged to place said shaft in tension between opposite ends of said drum, said take-up means consisting of a first member secured to said shaft and a second member engaging said drum and means for drawing said members towards each other, said drum including internal compression members spacing the opposite ends of said drum apart and being arranged to be placed in compression by said take-up means, said drum and said shaft constituting a rigid assembly arranged to reduce lateral whipping of said shaft on rapid rotation of said drum.

2. A washer and extractor construction for a dry cleaner comprising a stationary casing, bearings carried by opposite walls of said casing, a shaft revolubly supported by said bearings, a rotary basket rigid with said shaft and located within said casing and spaced a greater distance from one of said walls of said casing than from the other wall, a rigid attaching member carried by and attached to said shaft and extending from one end of said basket to adjacent the corresponding bearing and rigidly secured to the said end of said basket, a second attaching member secured to the other end of said basket and to said shaft and including take-up means, said take-up means consisting of a first member secured to said shaft and a second member engaging said drum and means for drawing said members towards each other and a tubular compression member located internally of said basket and surrounding and spaced from said shaft, said take-up means being arranged to place said shaft in tension and said compression member in compression.

3. In a device of the class described, a casing having spaced bearings, a shaft revolubly supported by said bearings, a rotary sheet metal drum carried by said shaft between said bearings, said drum having end walls provided with relatively heavy plates having outwardly flaring conical openings through which said shaft passes, means secured to said shaft and having a conical portion fitting within the conical opening of one of said plates, a split conical member gripping said shaft and fitting into the conical opening in the other of said plates, and take-up means between said split conical member and said shaft, said drum including an internally located tubular member surrounding said shaft and spacing the end walls of said drum apart, said take-up means being arranged to place said shaft in tension between the end walls of said drum and being arranged to place said tubular member in compression.

BYRON R. WINBORN, Jr.

REFERENCES CITED

The following references are of record in the file of this patent:

UNITED STATES PATENTS

| Number | Name | Date |
|---|---|---|
| 431,749 | De Laval | July 8, 1890 |
| 431,750 | De Laval | July 8, 1890 |
| 1,164,619 | Jefferson | Dec. 14, 1915 |
| 1,797,876 | Mitchum | Mar. 24, 1931 |
| 1,938,332 | Hargraves | Dec. 5, 1933 |